(12) United States Patent
Gong et al.

(10) Patent No.: US 11,414,341 B2
(45) Date of Patent: Aug. 16, 2022

(54) DOPED BISMUTH SILICATE CRYSTALS VIA DEVITRIFICATION OF GLASS FORMING LIQUIDS

(71) Applicant: Glass Coatings & Concepts, LLC, Monroe, OH (US)

(72) Inventors: Yuxuan Gong, Granville, OH (US); Mariano H. Velez, Middletown, OH (US)

(73) Assignee: Glass Coatings & Concepts, LLC, Monroe, OH (US)

( * ) Notice: Subject to any disclaimer, the term of this patent is extended or adjusted under 35 U.S.C. 154(b) by 0 days.

(21) Appl. No.: 16/352,228

(22) Filed: Mar. 13, 2019

(65) Prior Publication Data
US 2019/0284090 A1 Sep. 19, 2019

Related U.S. Application Data

(60) Provisional application No. 62/642,712, filed on Mar. 14, 2018.

(51) Int. Cl.
*C03C 10/00* (2006.01)
*C03C 1/02* (2006.01)
(Continued)

(52) U.S. Cl.
CPC .......... *C03C 10/0009* (2013.01); *C03C 3/062* (2013.01); *C03C 3/095* (2013.01); *C03C 4/12* (2013.01); *C03C 12/00* (2013.01); *C04B 35/16* (2013.01); *C04B 35/62645* (2013.01); *C04B 35/62675* (2013.01); *C04B 35/653* (2013.01);

*C09K 11/025* (2013.01); *C09K 11/7442* (2013.01); *C09K 11/7721* (2013.01); *C09K 11/7758* (2013.01); *C09K 11/7764* (2013.01);
(Continued)

(58) Field of Classification Search
CPC .............................. C03C 10/0009; C03C 1/02
See application file for complete search history.

(56) References Cited

U.S. PATENT DOCUMENTS 5,783,507 A    7/1998  Sakoske

FOREIGN PATENT DOCUMENTS

CN         103643293 A   *  3/2014
EP         1 496 025 A1     1/2005

OTHER PUBLICATIONS

Xiong, Z., et al., "Emission spectra and thermoluminescence of rare-earth-doped bismuth silicate crystals grown by modified Bridgman method," Journal of Crystal Growth, 2014, 401:305-307, 3 pgs.
(Continued)

*Primary Examiner* — Karl E Group
(74) *Attorney, Agent, or Firm* — Frost Brown Todd LLC

(57) ABSTRACT

This technology is directed to the preparation of doped-bismuth-silicate seed crystals through controlled crystallization (e.g. dimensionality of growth and nucleation mechanism) and the method of forming high purity single seed (particle size ranges from micrometers to millimeters) for various uses. These seed crystals have a nominal stoichiometry of $Bi_{2-x}A_xSiO_5$, $Bi_{2-x}A_xSi_3O_9$, $Bi_{4-x}A_xSi_3O_9$, and $Bi_{12-x}A_xSiO_{20}$, where A is a rare earth dopant selected from La, Ce, Nd, Pr, and/or Sm.

10 Claims, 4 Drawing Sheets

(51) Int. Cl.
    *C03C 12/00*     (2006.01)
    *C04B 35/16*     (2006.01)
    *C04B 35/626*    (2006.01)
    *C04B 35/653*    (2006.01)
    *C09K 11/74*     (2006.01)
    *C09K 11/02*     (2006.01)
    *C09K 11/77*     (2006.01)
    *C03C 3/062*     (2006.01)
    *C03C 3/095*     (2006.01)
    *C03C 4/12*      (2006.01)

(52) U.S. Cl.
    CPC ............ *C03C 2201/3417* (2013.01); *C03C 2201/3423* (2013.01); *C03C 2201/3429* (2013.01); *C03C 2201/3435* (2013.01); *C03C 2201/3441* (2013.01); *C03C 2203/54* (2013.01); *C04B 2235/3224* (2013.01); *C04B 2235/3227* (2013.01); *C04B 2235/3229* (2013.01); *C04B 2235/3298* (2013.01); *C04B 2235/3418* (2013.01); *C04B 2235/36* (2013.01); *C04B 2235/442* (2013.01)

(56) References Cited

OTHER PUBLICATIONS

Yiying, F., et al., "Vertical Bridgman Growth and Scintillation Properties of Doped $Bi_4Si_3O_{12}$ Crystals," Crystal Research and Technology, 1999, 34(9):1149-1156, 8 pgs.

International Search Report and Written Opinion dated Jul. 4, 2019 for Application No. PCT/US2019/021997, 11 pgs.

\* cited by examiner

DOPED BISMUTH SILICATE CRYSTALS VIA DEVITRIFICATION OF GLASS FORMING LIQUIDS

BACKGROUND

Bismuth-silicate-doped glasses are very attractive and important optical materials for various scientific as well as technological applications. This work is representative of devitrification (or controlled crystallization) of a glass forming liquid, in this case a bismuth-silicate melt. Controlled crystallization is a general process that is used in the fabrication of glass-ceramic components. The temperature profile for controlled crystallization includes at least two steps: nucleation at temperatures slightly above the annealing temperature, and then crystallization at higher temperatures. The nucleating agents can affect the crystallization by acting either as seeds, catalysts of phase separation, or reducing the interfacial tension between solid and liquid phases. In the present application, controlled crystallization is achieved by selection of the bismuth-silicate base glass, specific additives, and a selected temperature profile for nucleation and growth of rare-earth doped bismuth-silicate crystal seeds. The disclosure relates to a series of bismuth-silicate glass compositions, particularly the making of their crystalline counterparts, and the use of the crystalline counterparts for various applications. Bismuth-silicate crystals are suitable surrogates for bismuth-germanate crystals, which possess good radiation hardness, high energy resolution, and high scintillating efficiency when used as detectors and oscillators and depending on their stoichiometry. Despite the crucial role of bismuth-germanate crystals in electro-optical, electro-magneto applications, and defense technology, the cost of germanium has limited their use. Given the similarity between Si and Ge, both as tetragens, bismuth-silicate crystals were widely considered as substitutions for bismuth-germanates.

In addition, this disclosure relates to the seed crystals for partially crystallizing enamels used in automotive applications. Automotive enamel forms the colored border on automotive glasses to provide desired appearances as well as protecting the organic adhesive seal from UV degradation. Automotive enamel generally consists of glass frits, colorants, and organic vehicles. The enamel is applied onto glass substrates, fired to burn off the organic vehicle, and sinter the frits thus bonding the ceramic enamel onto glass substrates. During the firing process, which can also be a forming process of the glass substrate into final shapes, many prior art coatings (enamels) show failure to release from the forming die, which is typically covered with metal fiber or fiber glass, at elevated temperatures. Various additives including metals, metallic oxides, and crystals have been suggested to facilitate the release of forming die from glass sheets. Particularly, bismuth-silicate crystal has been proven to be useful for such purpose. However, the making of "anti-stick" seed crystals involves a solid state reaction with significant yields of by-products and high energy consumption often with operating temperatures above 1000° C. for more than 48 hours. These seeds are to be used as nucleating agents for controlled crystallization in other high-silica glasses, in particular for controlled crystallization of Bi—Zn-borosilicate based enamels for automotive windshields.

Therefore, the need for controllable crystallization and usable stoichiometry of crystals calls for a state-of-the-art process of making high purity crystal with less energy consumption. The present invention provides such dynamic chemistries as doped-bismuth-silicate crystals, a method for making doped-bismuth-silicate crystals, and applications in various fields.

BRIEF SUMMARY

Figure 1:
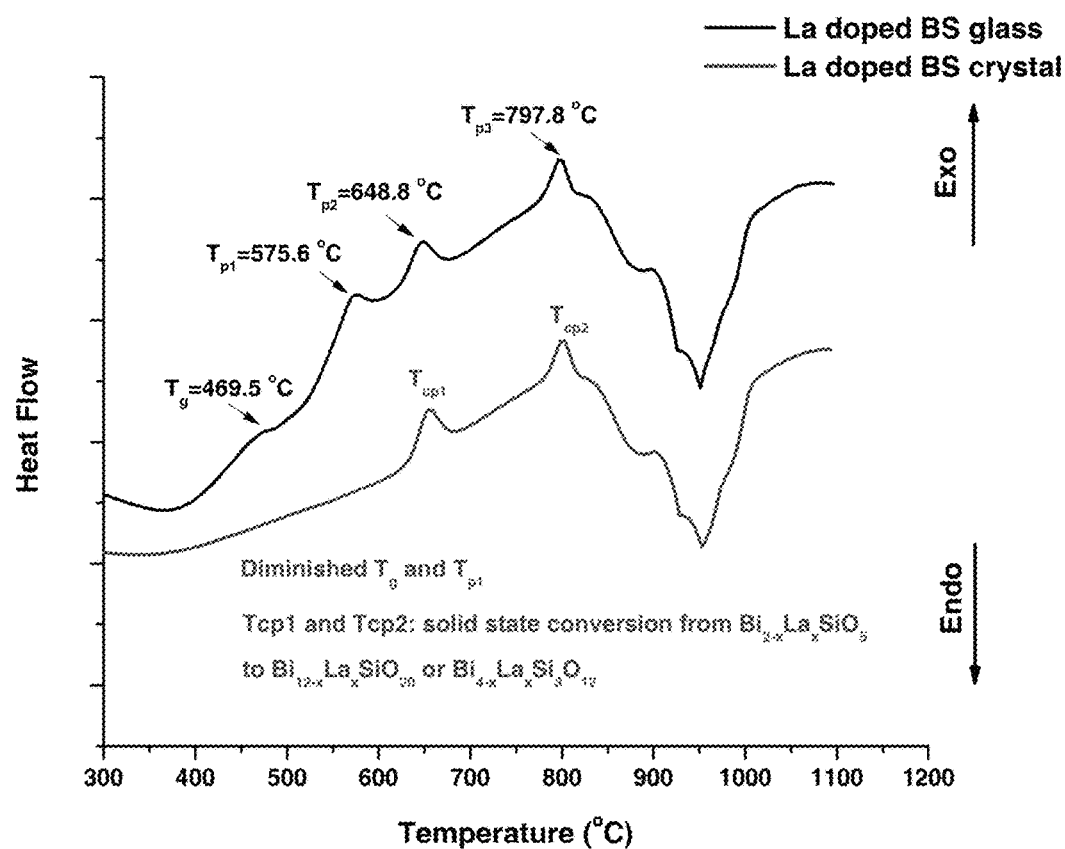
FIG. 1 shows the differential scanning calorimetry (DSC) curve of a lanthanum-doped bismuth-silicate glass and its crystalline counterparts. The lanthanum-bismuth-silicate crystal was obtained from the devitrification of its glass counterparts. After devitrification, a heat-treatment process, the glass transition temperature ($T_g$) and crystallization peaks ($T_{p1}$) were diminished from the DSC curve of the lanthanum-doped bismuth-silicate glass. Therefore, a high-crystalline-phase yield rate of this devitrification process was confirmed with DSC analyses.

This technology is directed to the preparation of doped-bismuth-silicate (BS) seed crystals with controlled crystallization (e.g. dimensionality of growth and nucleation mechanism) and the method of forming high purity single seed (particle size ranges from micrometers to millimeters) for various uses. These could include, but are not limited to, a seed crystal for automotive enamel, optical devices, luminescent materials, and defense technology.

This new technology for creating a higher yield of crystal production as compared to earlier technology such as solid-state reactions or calcination processes overcomes the problems and disadvantages associated with earlier technology through a higher crystal conversion rate (~12 hours) as comparing to a solid state reaction (>48 hours).

This technology increases the solubility of dopants (alien cations) in desired crystalline phases, and solves the inhomogeneity issue related to solid state reaction synthesis of bismuth-silicate crystals via mixing through glass melting process. Therefore, the production cost of waste recycling and thermal energy can be significantly reduced.

These and other embodiments of the invention are described herein below or are evident to persons of ordinary skill in the art based on the following disclosures.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

DETAILED DESCRIPTION

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods, devices, and materials are now described. All references, publications, patents, patent applications, and commercial materials mentioned herein are incorporated herein by reference for all purposes including for describing and disclosing the methodologies which are reported in the publications which might be used in connection with the invention. Nothing herein is to be construed as an admission that the invention is not entitled to antedate such disclosure by virtue of prior invention.

This present technology comprises a mixture of lanthanum carbonate, neodymium oxide, praseodymium oxide, cerium oxide, samarium oxide, bismuth trioxide, and $SiO_2$ which were melted at 2000° F. for approximately 1 hour. Other elements and temperature ranges include: (when used separately as dopant): La, Nd, and Ce temperatures range from about 2000 to 2500° F. for about 0.5 to 3 hours; Pr, Sm temperatures range from 2200 to 2500° F. for 1 to 2 hours. In general, $Bi_2O_3$ and $SiO_2$ are the main components of the parent glass compositions. $Bi_2O_3$ may range from about 10 mole % to about 50 mole %, while $SiO_2$ is typically between about 20 mole % to about 60 mole %. Other oxides are between about 10 and 20 mole %, while rare earth oxides are generally below about 10 mole %. Each rare earth oxide was added and tested individually, but mixes can be made by extension of the procedure. In general, glass melts are made between 2000 F and 2500 F, and between 45 min to 2 h firing in electric melters. Higher $SiO_2$ content (above 35 mole %) required the higher temperatures: 2250 to 2450 F.

The resulting glass melt composition has a nominal stoichiometry of $Bi_{2-x}A_xSiO_5$, $Bi_{2-x}A_xSi_3O_9$, $Bi_{4-x}A_xSi_3O_9$, and $Bi_{12-x}A_xSiO_{20}$ (A=La, Ce, Nd, Pr, or Sm; x=0.001 to 0.1; x=0.001 to 0.05). The glass melt was quenched in tap water, and dried in resistively-heated oven overnight (~16 hours). The glass melt may be milled with alumina balls in a planetary ball mill (deionized water or reverse osmosis water as medium), dried using microwave for 10 minutes, and stored in HDPE (high density polyethylene) containers prior to any analysis. Milling may also be effected in wet ball mills using rollers, using either alumina or zirconia milling media. Submicron sizes may be obtained with horizontal mills, using 1 mm diameter high density zirconia media. Other milling techniques may include Spex mills and attrition mills.

The doped bismuth-silicate crystals, formed as a glass, were synthesized by heating the glass powder or frits at 550 to 950° C. for 12 to 24 hours (depending on the kinetic parameters obtained from DSC analyses), the glass frits were placed into a stainless steel cup or an aluminosilicate crucible during the crystallization process. Heating ranges for the bismuth-silicate crystals may also include 550 to 700 C for 12 to 24 hours, generally; La: 12 to 18 hours; Nd, Sm: 18 to 24 hours; Ce: 20 to 22 hours; Pr: 14 to 18 hours. In general, heating times were tested up to 48 h.

FIG. 1 shows the DSC curve of a glass frit and its crystalline counterpart (e.g. La-doped bismuth-silicate: $Bi_{1.9}La_{0.1}SiO_5$). After the crystallization process, the first crystallization peak (heavy curve) at ~580° C. was diminished on the DSC curve of La-doped bismuth-silicate crystal (light curve) indicating a full devitrification of the La-doped bismuth-silicate glass. The second and third crystallization peaks of La-doped bismuth-silicate glass is related to the polymorphic change of La-doped bismuth-silicate crystal.

Upon completion of the crystallization process, a milky, shiny, yellowish-colored solid particle or chunk was yielded depending on the form of the starting glassy materials (e.g. powders or frits). In addition, the La-doped bismuth-silicate crystal was not sticking to the heat treatment saggers (i.e. aluminosilicate ceramic container for heat treatment) as opposed to most glasses.

Figure 2:
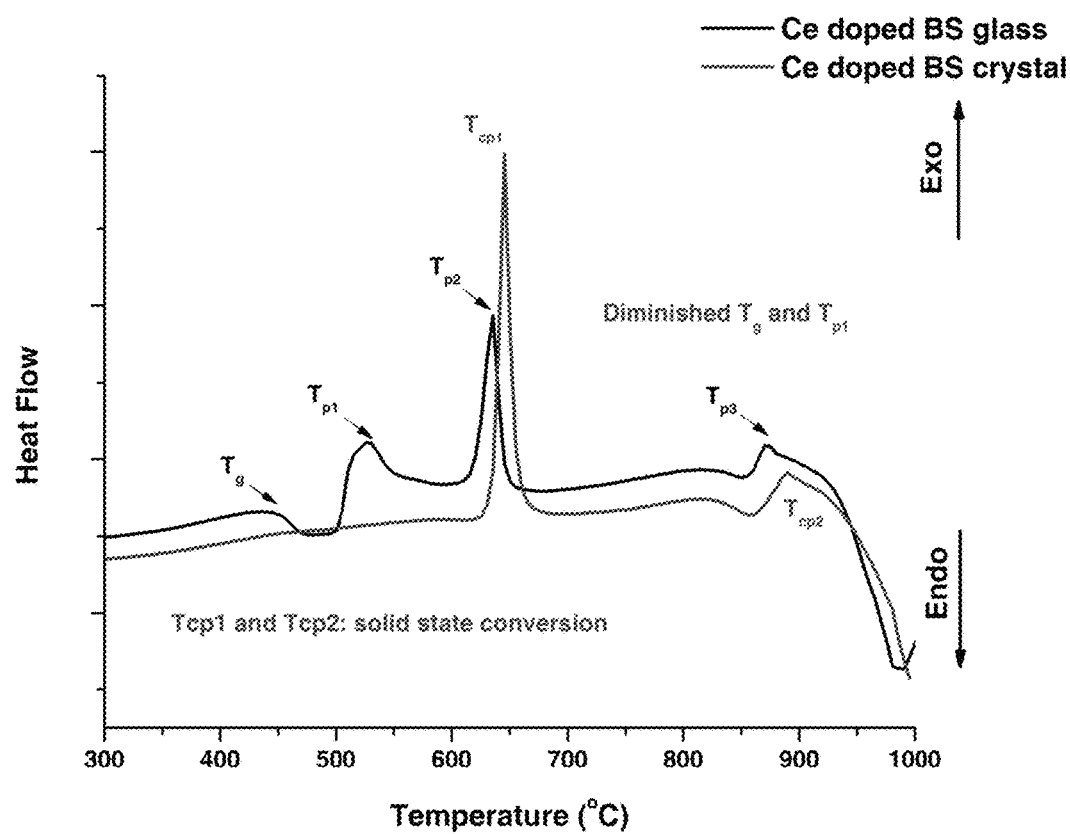
FIG. 2 shows the differential scanning calorimetry (DSC) curve of a cerium-doped bismuth-silicate glass and its crystalline counterparts. The cerium-bismuth-silicate crystal was obtained from the devitrification of its glass counterparts. After devitrification, a heat-treatment process, the glass transition temperature ($T_g$) and crystallization peaks ($T_{p1}$) were diminished from the DSC curve of cerium-doped bismuth-silicate glass. Changes in the peak positions and peak shapes of $T_{p2}$ and $T_{p3}$ are associated with the conversion of Ce—Bi—Si crystal polymorphs.

Ce-doped bismuth silicate: FIG. 2 shows the DSC curve of a Ce-doped bismuth-silicate glass and its crystalline counterparts. The chemical composition of this glass or crystal is composed of 49.99 mol % $Bi_2O_3$, 0.01 mol % $CeO_2$, and 50 mol % of $SiO_2$. Raw materials, as given in the chemical composition, were mixed, melted, and quenched in water. The resultant glass frits were heat treated at 530° C. (corresponding to $T_{p1}$) for 10 hours. The devitrified glass, or Ce-doped bismuth-silicate crystal, shows a shiny brown tint in various particle shapes.

Figure 3:
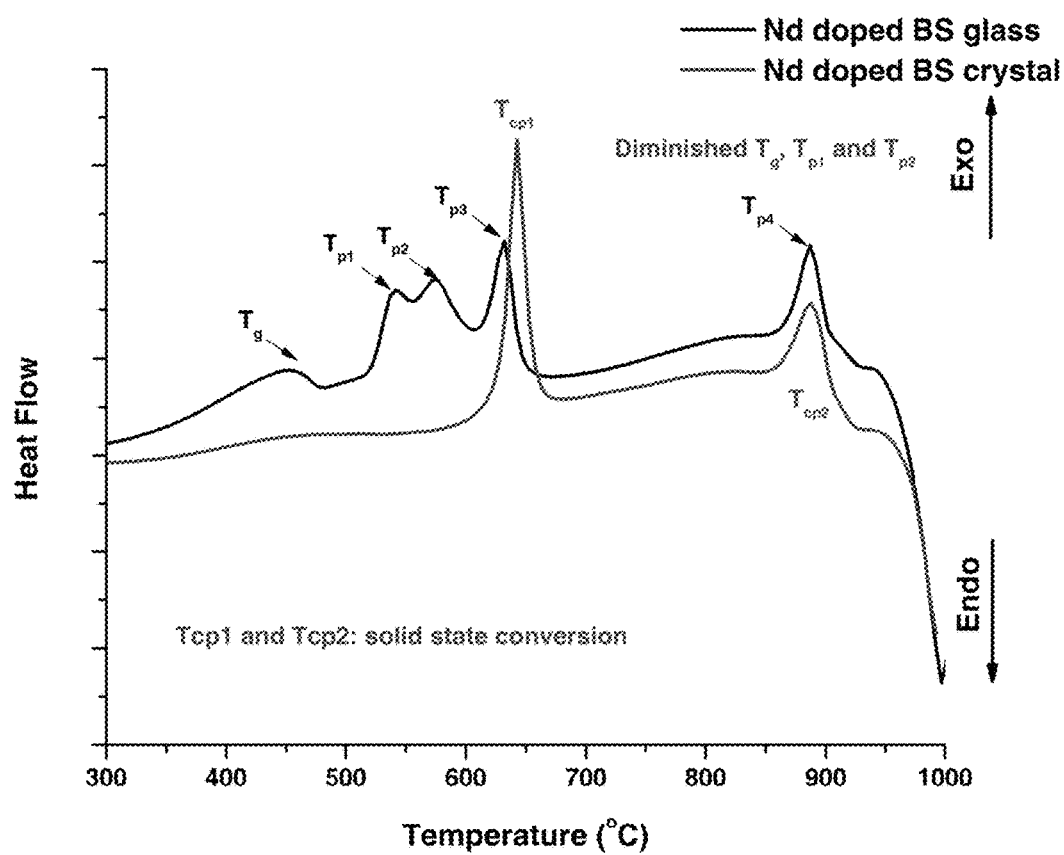
FIG. 3 is the differential scanning calorimetry (DSC) curve of a neodymium-doped bismuth-silicate glass and its crystalline counterparts. The neodymium-bismuth-silicate crystal was obtained from a similar devitrification process as La and Ce doped bismuth-silicate glass. After heat treatment, the glass transition temperature (Tg) and crystallization peaks ($T_{p1}$ and $T_{p2}$) were diminished from the DSC curve of neodymium-doped bismuth-silicate glass. Changes in the peak positions and peak shapes of $T_{p1}$ and $T_{p2}$ are associated with the conversion of Nd—Bi—Si crystal polymorphs.

Nd-doped bismuth-silicate: FIG. 3 shows the DSC curve of a Nd-doped bismuth-silicate glass and its crystalline counterparts. The chemical composition of this glass or crystal is composed of 49.995 mol % $Bi_2O_3$, 0.005 mol % $Nd_2O_3$, and 50 mol % of $SiO_2$. Raw materials, as given in the chemical composition, were mixed, melted, and quenched in water. The resultant glass frits were heat treated at 540° C. (corresponding to $T_{p1}$) for 13 hours. The devitrified glass, or Nd-doped bismuth-silicate crystal, shows a shiny greenish-yellow color in various particle shapes.

Sm-doped bismuth-silicate: Similarly, samarium-doped bismuth-silicate crystals were made with the chemical composition of 49.995 mol % $Bi_2O_3$, 0.005 mol % $Sm_2O_3$, and 50 mol % of $SiO_2$. Raw materials, as given in the chemical composition, were mixed, melted, and quenched in water. The resultant glass frits were heat treated at 560° C. (corresponding to $T_{p1}$) for 8 hours. The devitrified glass, or Sm-doped bismuth-silicate crystal, shows a light brownish-yellow color in various particle shapes.

In addition, praseodymium-doped bismuth-silicate crystals with the chemical composition of 49.995 mol % $Bi_2O_3$, 0.005 mol % $Pr_2O_3$, and 50 mol % of $SiO_2$ show a shiny purple tint. The upper limits of dopant amount are related to the ionic radii of dopants, solubility of dopants in the glass or crystals, and the desired crystallographic structure of final crystalline product. Information regarding those technical details is not presented in this disclosure.

Figure 4:
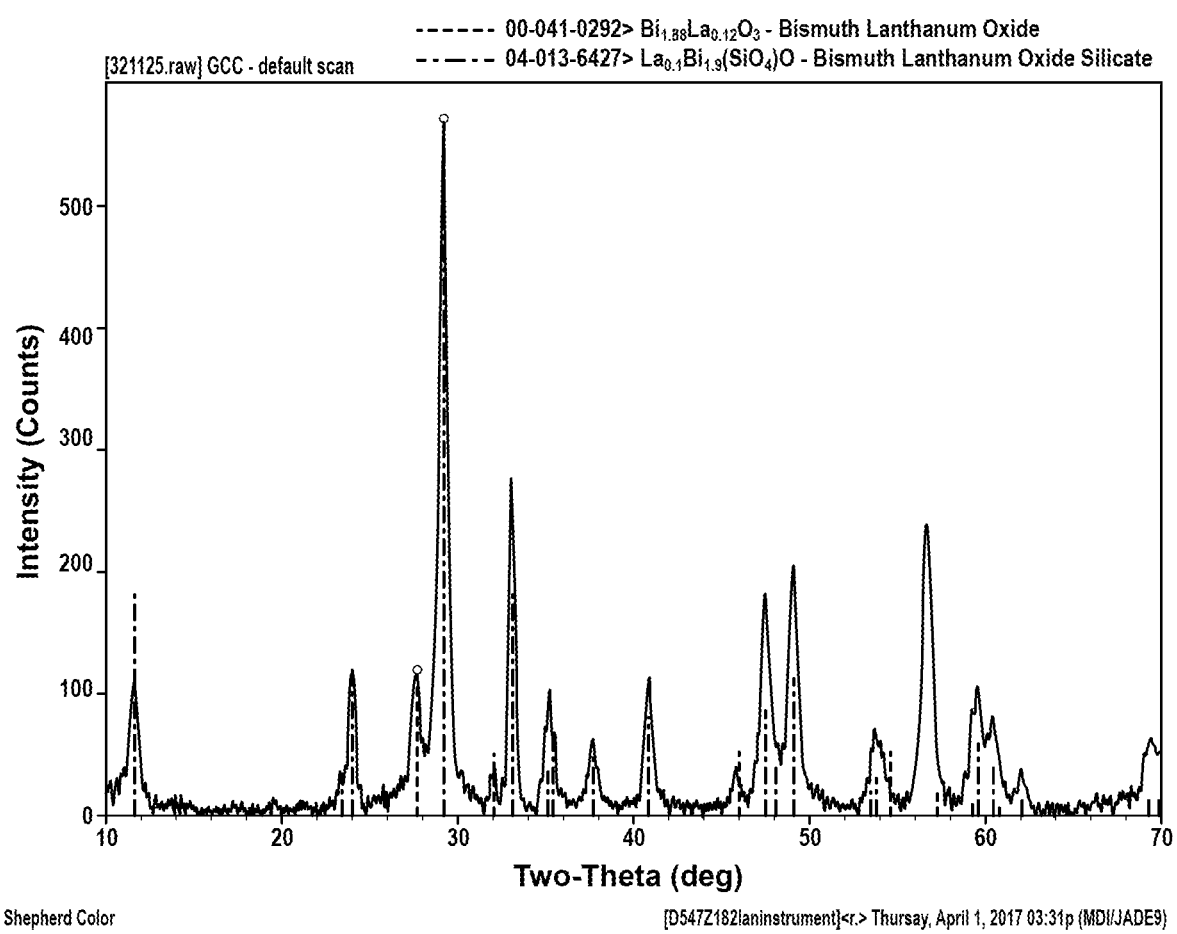
FIG. 4 shows a typical diffraction pattern of an as-prepared doped-bismuth-silicate crystal with minor oxide impurities. The indexed peaks were lanthanum-doped bismuth-silicate crystalline diffraction peaks. The impurities, in oxide form, can be avoided via control of the crystallization temperature as well as control of the concentration of lanthanum in the starting materials.

FIG. 4 shows a typical diffraction pattern related to the stoichiometry presented in the description. The indexed peaks were lanthanum-doped bismuth-silicate crystalline diffraction peaks. The impurities, in oxide form, can be avoided via control of the crystallization temperature as well as of the concentration of lanthanum in the starting materials. However, the existence of impurities (as in minor amounts) will not affect the use of current invention related to automotive enamel.

What is claimed is:

1. A doped bismuth-silicate seed crystal comprising from 48.750 to 49.975 mol % bismuth trioxide, 50.000 mol % silicon dioxide, and 0.025 to 1.250 mol % of a rare earth dopant A, having a stoichiometry of $Bi_{2-x}A_xSiO_5$, and where $x=0.001$ to $0.05$.

2. The doped bismuth-silicate seed crystal of claim 1, wherein the dopant A is selected from the group consisting of lanthanum, neodymium, praseodymium, cerium, samarium, and mixtures thereof.

3. The doped bismuth-silicate seed crystal of claim 2, wherein the dopant is Sm.

4. The doped bismuth-silicate seed crystal of claim 2, wherein the dopant is Pr.

5. The doped bismuth-silicate seed crystal of claim 2, wherein the dopant is Nd.

6. A doped bismuth-silicate seed crystal wherein the dopant is La, with a stoichiometry of $Bi_{1.9}La_{0.1}SiO_5$.

7. The doped bismuth-silicate seed crystal of claim 2, wherein the dopant is Ce.

8. The doped bismuth-silicate seed crystal of claim 1 for use in automotive enamels.

9. The doped bismuth-silicate seed crystal of claim 1 for use in optical devices.

10. The doped bismuth-silicate seed crystal of claim 1 for use in luminescent materials.

* * * * *